US008392511B2

(12) United States Patent
Chakra et al.

(10) Patent No.: US 8,392,511 B2
(45) Date of Patent: Mar. 5, 2013

(54) EMBEDDING A UNIQUE SERIAL NUMBER INTO THE CONTENT OF AN EMAIL FOR TRACKING INFORMATION DISPERSION

(75) Inventors: Al Chakra, Apex, NC (US); Simon P. O'Doherty, Dublin (IE); John Rice, Tramore (IE); Beng Kong Yap, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 12/015,585

(22) Filed: Jan. 17, 2008

(65) Prior Publication Data

US 2009/0187629 A1 Jul. 23, 2009

(51) Int. Cl.
*G06F 15/16* (2006.01)
*G06F 15/173* (2006.01)
(52) U.S. Cl. .................. 709/206; 709/207; 709/224
(58) Field of Classification Search .......... 709/203, 709/206, 207, 219, 224, 236; 726/30, 32; 704/10
See application file for complete search history.

(56) References Cited

U.S. PATENT DOCUMENTS

| 7,167,825 | B1 | 1/2007 | Potter |
| 7,444,328 | B2 * | 10/2008 | Starbuck .............................. 1/1 |
| 7,552,179 | B2 * | 6/2009 | Jain et al. ...................... 709/206 |
| 7,584,251 | B2 * | 9/2009 | Brown et al. ................. 709/206 |
| 7,630,691 | B2 * | 12/2009 | Chen et al. ................. 455/67.11 |
| 7,657,603 | B1 * | 2/2010 | He et al. ......................... 709/206 |
| 7,664,821 | B1 * | 2/2010 | Ancin et al. .................. 709/206 |
| 7,698,370 | B1 * | 4/2010 | Hall .............................. 709/206 |
| 7,720,846 | B1 * | 5/2010 | Bayliss .......................... 707/736 |
| 7,813,959 | B2 * | 10/2010 | Sobotka et al. ............. 705/14.54 |
| 7,836,061 | B1 * | 11/2010 | Zorky ........................... 707/749 |
| 7,856,479 | B2 * | 12/2010 | Bellegarda et al. ........... 709/206 |
| 7,912,828 | B2 * | 3/2011 | Bonnet et al. ................. 707/706 |
| 7,975,290 | B2 * | 7/2011 | Chow et al. ....................... 726/5 |

(Continued)

FOREIGN PATENT DOCUMENTS

| GB | 2208730 A | * | 4/1989 |
| JP | 02064859 A | * | 3/1990 |

(Continued)

OTHER PUBLICATIONS

Wagner, N., R., "Figerprinting", Proceedings of the 1983 Symposium on Security and Privacy, pp. 18-22, Apr. 1983.

(Continued)

*Primary Examiner* — Melvin H Pollack
(74) *Attorney, Agent, or Firm* — Patents on Demand P.A.; Brian K. Buchheit; Scott M. Garrett

(57) ABSTRACT

The present invention discloses a solution for tracking email dispersion through content substitution. In the solution, a set of entities to receive an email can be identified, where the email can contains textual content. A subset of words contained within the textual content can be programmatically selected. A set of replacement words for each of the determined words can be determined. For each email receiving entity, at least one replacement word can be programmatically substituted for it's equivalent to generate an entity specific message. Each entity specific message can contain a unique combination of substitutions so that no two entity specific message are identical. A record of which email receiving entities are associated with which entity specific message can be maintained. The entity specific messages can be sent to the associated set of email receiving entities.

20 Claims, 4 Drawing Sheets

U.S. PATENT DOCUMENTS

| | | | |
|---|---|---|---|
| 8,201,139 B2 * | 6/2012 | Chang et al. | 717/104 |
| 8,229,733 B2 * | 7/2012 | Harney et al. | 704/9 |
| 2001/0051996 A1 * | 12/2001 | Cooper et al. | 709/217 |
| 2003/0139140 A1 * | 7/2003 | Chen et al. | 455/67.1 |
| 2004/0073617 A1 * | 4/2004 | Milliken et al. | 709/206 |
| 2004/0204988 A1 * | 10/2004 | Willers et al. | 705/14 |
| 2005/0188077 A1 * | 8/2005 | Quintanilla et al. | 709/224 |
| 2007/0276911 A1 * | 11/2007 | Bhumkar et al. | 709/206 |
| 2007/0299922 A1 * | 12/2007 | Katou | 709/206 |
| 2009/0083314 A1 * | 3/2009 | Maim | 707/103 R |
| 2009/0172109 A1 * | 7/2009 | Weir et al. | 709/206 |

FOREIGN PATENT DOCUMENTS

| | | | |
|---|---|---|---|
| JP | 02129756 A | * | 5/1990 |
| JP | 05233691 A | * | 9/1993 |

OTHER PUBLICATIONS

"EFF: DocuColor Tracking Dot Decoding Guide", Electronic Frontier Foundation, 2005.

Kahney, L., "Steve Jobs, Spymaster", Wired News, TechBiz—People, Mar. 6, 2007.

* cited by examiner

E-mail Client 205

| To: | Joe Doe; Jane Smith; Alex Gooding; John Soft |
| Cc: | |
| Bcc: | |
| Subject: | Important announcement |

206

[Send] [Save as Draft] [Discard] [Embed Serial Number(s)] 208

Over the last 20 years, we have remained dedicated to a single mission: ensuring the success of customers who depend on developing or deploying software. During those 20 years, we have taken the company through many stages as we drove it to the next level, ahead of the market. The latest stage began in 1997 when we increased our capabilities by acquiring a number of leading tools companies in the software development tools market, resulting in our product line. This strategy was very successful and today we see many of our competitors emulating it.

210

Dispersion Tracking Configuration 250

Serial Number Type: 252 — Linked to Employee ID ▼

Number of Serials to Embed: 254 — 4

Serial Checking: 256
- ● CRC
- ○ Modulus
- ○ None

258
- ● Let Me Choose Word Replacements
- ○ Randomly Generate Results

[Continue] [Cancel]

Information Dispersion Tracking Configuration 305

| To: | Joe Doe; Jane Smith; Alex Gooding; John Soft |
|---|---|
| Subject: | Important announcement |

Serial Numbers to be Generated: 4     310

Over the last 20 years, we have remained dedicated to a single mission: ensuring the success of customers who depend on developing or deploying software. During those 20 years, we have taken the company through many stages as we drove it to the next level, ahead of the market. The latest stage began in 1997 when we increased our capabilities by acquiring a number of leading tools companies in the software development tools market, resulting in our Rational Suite product line. This strategy was very successful and today we see many of our competitors emulating it. 311

Possible Word Replacements 312

- Committed
- devoted
- enthusiastic
- hard-working
- purposeful
- single-minded
- Sworn
- true blue
- wholehearted
- zealous

314

Replacement Preview Interface 350

| Over the last 20 years, we have remained committed to a single mission: ensuring the success of customers who depend on developing or deploying software. 352 ☑ 354 | Over the last 20 years, we have remained enthusiastic to a single mission: ensuring the success of customers who depend on developing or deploying software. 356 ☑ 358 |
|---|---|
| Over the last 20 years, we have remained purposeful to a single mission: ensuring the success of customers who depend on developing or deploying software. 360 ☐ 362 | Over the last 20 years, we have remained wholehearted to a single mission: ensuring the success of customers who depend on developing or deploying software. 364 ☑ 366 |

[ Continue ]     [ Cancel ]

FIG. 3

EMBEDDING A UNIQUE SERIAL NUMBER INTO THE CONTENT OF AN EMAIL FOR TRACKING INFORMATION DISPERSION

BACKGROUND

1. Field of the Invention

The present invention relates to the field of email tracking and, more particularly, to embedding a unique serial number into the content of an email for tracking information dispersion.

2. Description of the Related Art

In business today, email is commonly used to communicate with a business' employees. Often these emails contain sensitive information that is not intended for public consumption. Many problems could arise for a business if such sensitive information was leaked. For example, an email could contain information regarding a new line of products in development by the company. If this information was leaked to a competitor for example, this could give the competitor the chance to come up with a better product before the product is even released.

Currently, protection exists to keep a user from copying sensitive information, but these protections can easily be circumvented. For example, a user can take screenshots of the information, or copy them to a USB drive to prevent firewall based tracking. The user can then disperse the sensitive information to whoever they want. There are currently solutions for tracking down such information leaks. For example, one such solution is called a "canary trap" where the contents can be modified in each email and sent to a unique user, associating a revision of the content with the recipient user. When a leak occurs, the leaked text can be referenced to the user to find the source of the leak. The problem with implementing such a system is that a user has to manually do these modifications and track the changes with their associated users. This kind of implementation becomes very troublesome with a large number of recipient users. A more intuitive solution is required to track information dispersion in emails.

SUMMARY OF THE INVENTION

The present invention can allow for embedding a unique serial number into the content of an email for tracking information dispersion. This can allow a similar solution such as a "canary trap" to work on a much larger scale to track information dispersion. The present invention can allow the email author to build a serial number system into their email. A serial number can be embedded into email content by strategically changing words in the email content with synonyms. Each word replacement can have an associated bit flag or value. When all of the text replacements are processed together, their associated value or bit flag can create a unique serial number. In one embodiment, the replacements can occur at the client-side based upon substitutions defined in a unique, possibly encrypted header that is included with each sent message. When a leak occurs, the author can input the leaked text and the application can return the serial number for that revision. The disclosed invention can also allow the option to build in redundancy checking in the event a portion of the document is quoted. This also allows for the assignment of a serial number based on department. This can prevent two users from noticing a difference between emails sent to them and someone else in their department. The serial number can also include a CRC (Cyclic Redundancy Code) number or modulus check. This can prevent a recipient from noticing the serial number and attempting to change the number and potentially picking the wrong person as the source of the leak.

Another aspect of the present invention can include a user interface for configuring the embedded serial numbers and tracking them. One such user interface can allow a user to establish and identify interchangeable words in the email. Synonyms for these interchangeable words can be retrieved from a thesaurus and displayed for the user, which can allow the user to select which words to use for substitution. The present invention can also allow for random generation of email content with embedded serial numbers. A user can preview the generated revisions of the email content with embedded serial numbers for clarity, to make sure the initial content is still intact, before assigning each revision to a department, user, company, or the like. Serial numbers and therefore revisions of the email can be assigned to any distinguishable entity for tracking information dispersion.

BRIEF DESCRIPTION OF THE DRAWINGS

There are shown in the drawings, embodiments which are presently preferred, it being understood, however, that the invention is not limited to the precise arrangements and instrumentalities shown.

FIG. 2 illustrates a system of sample user interfaces for embedding a unique serial number into the content of an email for tracking information dispersion in accordance with an embodiment of the inventive arrangements disclosed herein.

FIG. 3 illustrates a system of sample user interfaces for embedding a unique serial number into the content of an email for tracking information dispersion in accordance with an embodiment of the inventive arrangements disclosed herein.

DETAILED DESCRIPTION OF THE INVENTION

Figure 1:
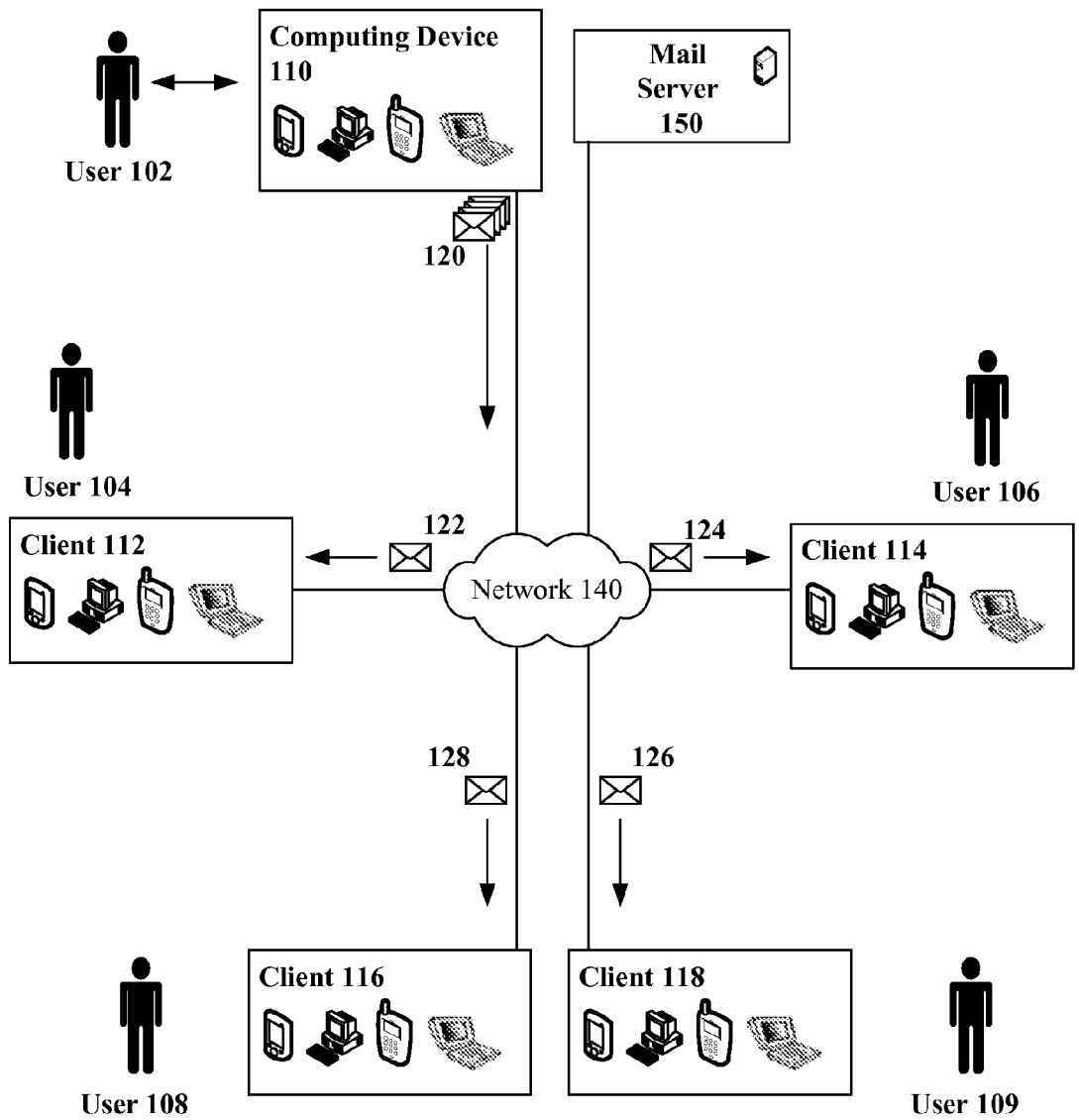
FIG. 1 is a schematic diagram of a system for embedding a unique serial number into the content of an email for tracking information dispersion in accordance with an embodiment of the inventive arrangements disclosed herein.

FIG. 1 is a schematic diagram of a system 100 for embedding a unique serial number into the content of an email for tracking information dispersion in accordance with an embodiment of the inventive arrangements disclosed herein. In system 100, user 102 can generate a series of emails 120 to be sent to recipient users 104, 106, 108, 109 with embedded serial numbers for tracking information dispersion. The serial number can be hidden in email content through a series of equivalent word substitutions. User 102 can interact with an email client running on computing device 110 to create the emails to be sent. Computing device 110 can interact with mail server 150 through network 140 to send emails 120. Emails 120 can be sent as emails 122, 124, 126, and 128 to user 104, 106, 109, and 108. Each email 122-128 can include a unique serial number that can identify the recipient of the email. Users 104, 106, 108, and 109 can use client 112, 114, 116, and 118 respectively to receive their associated email. If any user 104, 106, 108, or 109 were to share the content of a received email 122, 124, 126, or 128, the content of the email could be used to detect the source of the leak. The serial number can be retrieved from the leaked email, which would be associated with the recipient user that caused the information leak.

Further, the mail server 150 can include a tracking and automatic discovery capability, which makes detecting a leak source easier. The automatic discovery capability can permit content from a breeched message (e.g., unique content from message 122-128 that includes message 122-128 specific substitutions) to be fed into the server 150, which automatically returns a unique serial number associated with the breeched message and/or an identity of a user 104-109 associated with that serial number/breeched message.

In one embodiment, the actual content of a body of email 120 can be identical to the body content of each email 122-126 sent to the set of users 104-109. The unique serial number and/or word substitutions can be defined in an email 120 header, which is unique for each end-user 104-109. That is, a client-side program can use the header information, which can be encrypted, to generate a unique set of synonym substitutions. The client-side substitutions can be made before the email content is rendered to an associated user 104-109. Client-side substitutions has a benefit of minimizing an additional load imposed upon mail server 150, which would otherwise have to handle a unique email message 122-128 for each recipient (users 104-109).

Additionally, use of headers and client-side substitutions ensures that when another user is viewing messages 122-128 in a shared system, no extra substitution related overhead in incurred. For example, on a factory floor, a kiosk system can exist for users to log in and read an electronic bulletin board using a common machine. In such instances, the login of a user can define the user and a unique user-specific header used to perform substitutions. The bulletin board itself needs to contain only one message, which changes when another user logs into the kiosk system to read the message.

Computing device 110 can be any computing device capable of running an email client with extended functionalities for embedding a serial number or numbers into email content for tracking information dispersion. Computing device 110 can run an application to generate emails 120 and convey them to mail server 150 via network 140. The computing device 110 can be any computing device capable of reproducing the described functionality including, but not limited to, a laptop computer, a cell phone, a personal data assistant (PDA), a desktop computer, or the like.

Mail server 150 can be a computing device setup to receive incoming mail messages and transmit them to their intended recipients. In system 100, mail server 150 can receive emails 120 via network 140 and disperse them to their recipients as email 122, 124, 126, and 128. The mail server 150 can also be a bulletin board server, a BLOG server, and the like, where a unique content object can be a bulletin board message, a BLOG entry, and the like instead of an email message 122-128, as illustrated. Mail server 150 can be implemented in any way, including, but not limited to, a server computer, a desktop computer, a laptop computer, and the like.

Emails 122, 124, 126, and 128 can be serial embedded email messages intended for users 104, 106, 109, and 108 respectively. Each email can have a unique serial number embedded in its content to uniquely identify the source of the content. Words can be strategically replaced to create the embedded serial number. This can make the content in each email to be different, but still contain the same content. For example, words can be replaced with synonyms to keep the meaning of the content at least relatively the same. The emails 122, 124, 126, and 128 can be used to track the dispersion of the information contained in the emails.

Clients 112, 114, 116, and 118 can be used by user 104, 106, 108, and 109 to receive each email 122, 124, 126, and 128 respectively. Clients 112-118 can be any computing device equipped with a transceiver capable of communications via network 140 and capable of running an email client for receiving email. Clients 112-118 can be any computing device, including, but not limited to, a desktop computer, a laptop computer, a cell phone, a personal data assistant (PDA), or the like.

FIG. 2 illustrates a system 200 of sample user interfaces for embedding a unique serial number into the content of an email for tracking information dispersion in accordance with an embodiment of the inventive arrangements disclosed herein. In system 200, email client 205 can be an interface of an email client which can allow the creation of an email. Email client 205 can include button 208, which can initiate the process of embedding a serial number or numbers into the created email. Email client 205 can include standard fields 206 and content 210. Button 208 can be any GUI option that can allow for the initiation of the serial number embedding process. For example, button 208 can be a button, menu option, key combination, or the like. Standard fields 206 can include to, carbon copy (cc), blind carbon copy (bcc), subject, and the like. Content 210 can be the email content in which a serial number or numbers are to be embedded into. Email client 205 can be used to initiate the process of embedding serial numbers into email content to tracking information dispersion. Dispersion tracking configuration 250 can be shown after button 208 has been activated. Dispersion tracking configuration 250 can allow for initial settings to be configured before embedding the serial number or numbers into the email content. Dispersion tracking configuration 250 can include options such as serial number type 252, number of serials to embed 254, serial checking 256, and option 258. Email client 205 and dispersion tracking configuration 250 can be run on a computing device in context with computing device 110 in system 100.

Dispersion tracking configuration 250 can allow for the initial configuration of the process of embedding a serial number or numbers into email content 210. Dispersion tracking configuration 250 can include field serial number type 252. Serial number type 252 can include many options, including, but not limited to, a predefined number of serial numbers to embed, a range for each serial number, serial numbers that are linked to identifiable items such as employee ID or domain ID, and the like. Number of serials to embed 254 can be a field in which can show the detected number of serial numbers to embed depending on the option selected for serial number type 252. In the case that serial number type 252 is selected to be a predefined number of serial numbers, number of serials to embed 254 can be used to specify the number of serial numbers to embed. Serial checking 256 can be a field that can allow a user to specify whether to add cyclic redundancy checking, modulus, or no checking for the embedded serial. Option 258 can allow the user to specify whether to just give the user the options to choose which synonyms to replace words on email content 210 with or to allow the application to randomly generate revisions of email content 210 with words it sees fitting to generate the number of revisions matching the required serial numbers.

FIG. 3 illustrates a system 300 of sample user interfaces for embedding a unique serial number into the content of an email for tracking information dispersion in accordance with an embodiment of the inventive arrangements disclosed herein. In system 300, information dispersion tracking configuration 305 can be an interface used to define which words are to be replaced and by what words to embed a unique serial number. Content area 311 can show the email content and can display words that are replaceable differently.

In this example, words that are replaceable are displayed in bold, however the current invention can allow for any alternate display of replaceable words. A user can select a word to replace, which can allow possible word replacements 312 to be populated with synonyms of the selected word that can be possible substitutions. For example, word 310 can be highlighted after being selected, which can cause possible word replacements 312 to populate with synonyms of word 310. This can allow a user to select preferred substitutions. For example, words 314 can be selected as preferred substitutions for word 310. System 300 also includes replacement preview interface 350, which can be an interface that can be used to preview email content replacements before they're used. In this example, content 352 can be associated with checkbox 354, content 356 can be associated with 358, content 360 can be associated with checkbox 362, and content 364 can be associated with checkbox 366. In this example, a user can either check or uncheck a checkbox 354, 358, 362, 366 to approve or disapprove of the associated content.

It should be noted that system 300 represents an overly simplistic substitution scheme presented to illustrate the concepts of the invention. In most real world implementations, multiple words subject to substitution will be identified within an email body (instead of one as shown) and multiple different substitutions/replacement words will exist. A unique number (e.g., the serial number) can be assigned/generated to represent a set of unique word replacements. Storing/tracking unique serial numbers simplifies a management of a large number of email messages, each having a unique substitution set of words. Additionally, in one embodiment, substitutions can be performed client-side as defined by a header, as previously mentioned.

To illustrate by another example, the following table shows a replacement set of words for message 311. The table lists each original word, a replacement word, and a word location within the message.

| Original Word | Replacement Word | Word Location |
| --- | --- | --- |
| we | IBM team members | 6 |
| dedicated | committed | 9 |
| drove | lead | 30 |
| increased | exceeded | 48 |
| acquiring | purchasing | 52 |

Assuming header defined substitutions, a header for the above table can be:
  X-WordList1:UserID,None,IBM team members, 6, committed, 9, lead, 30, exceeded, 48, purchasing, 52.
This header follows a convention of:
  X-WordListn: SerialType, CRCChecking, Text, WordLocation, . . . Text-n, WordLocation-n
  X-WordListn can be a mail header, where n can be a header number that is a sequential number based upon a number of serial numbers to process.
  SerialType can be set to "UserID" or "DomainID." The SerialType can tell a client what serial number the header relates to.
  CRCChecking can be set to "None," "CRC," or "Modulus-11". This tells the client if the serial number has CRC or modulus checking to ensure the number isn't tampered with when converted to a serial number. If set to none then the serial number isn't modified.

Text, WordLocation specifies the replacement text and the word location that has to be replaced. The placement of the word specifies the bit flag it relates to. The first in the list relates to the right most bit flag and moves to the left on the next replacement word. If the replacement is a punctuation character then the character will be escaped out. For example, "\," can be used for a comma and "\\" can be used for a back slash.

In one arrangement, once headers are created they can be encrypted with a key that only the client can decrypt. The body of the text can also be encrypted with the same key. This ensures that only those clients conforming to the serial number system can read the email message. Additionally, the email system can be signed by a sender's signature to ensure that it is not tampered with in transit. A receiving client can detect that the message has an embedded serial number and can active a processing operation. The client can, for instance, determine a user's serial number and domain number using an address book look-up. If no CRC or Modulus check is established, it can be applied to the serial number prior to processing. The details from the header can permit the client to replace the selected text based upon bit flags value match up, before the email message is able to be viewed.

For example: a UserID can equal 25. (Binary format: 11001) and no CRC/Modulus-11 can be established. A user can receive the email message derived from message 311 of system 100 and based upon the header of:

Over the last 20 years, IBM team members have remained committed to a single mission: ensuring the success of customers who depend on developing or deploying software. During those 20 years, we have taken the company through many stages as we lead it to the next level, ahead of the market. The latest stage began in 1997 when we exceeded our capabilities by purchasing a number of leading tools companies in the software development tools market, resulting in our product line. This strategy was very successful and today we see many of our competitors emulating it.

Assuming the above text is leaked, it can be compared against the original message, shown in system 300 as message 311. In one embodiment the serial number for the message can be generated visually and cross referenced against the employee/domain. For example,

| | | |
| --- | --- | --- |
| IBM Team Members | | 00001 |
| exceeded | | 01000 |
| purchasing | | 10000 |
| Total | | 11001 = 25 |

Implementation specifics for the header-implemented example (above) are not meant to constrain the scope of the invention, but to illustrate one possible implementation scheme. Other implementation schemes and derivatives are contemplated.

Figure 4:
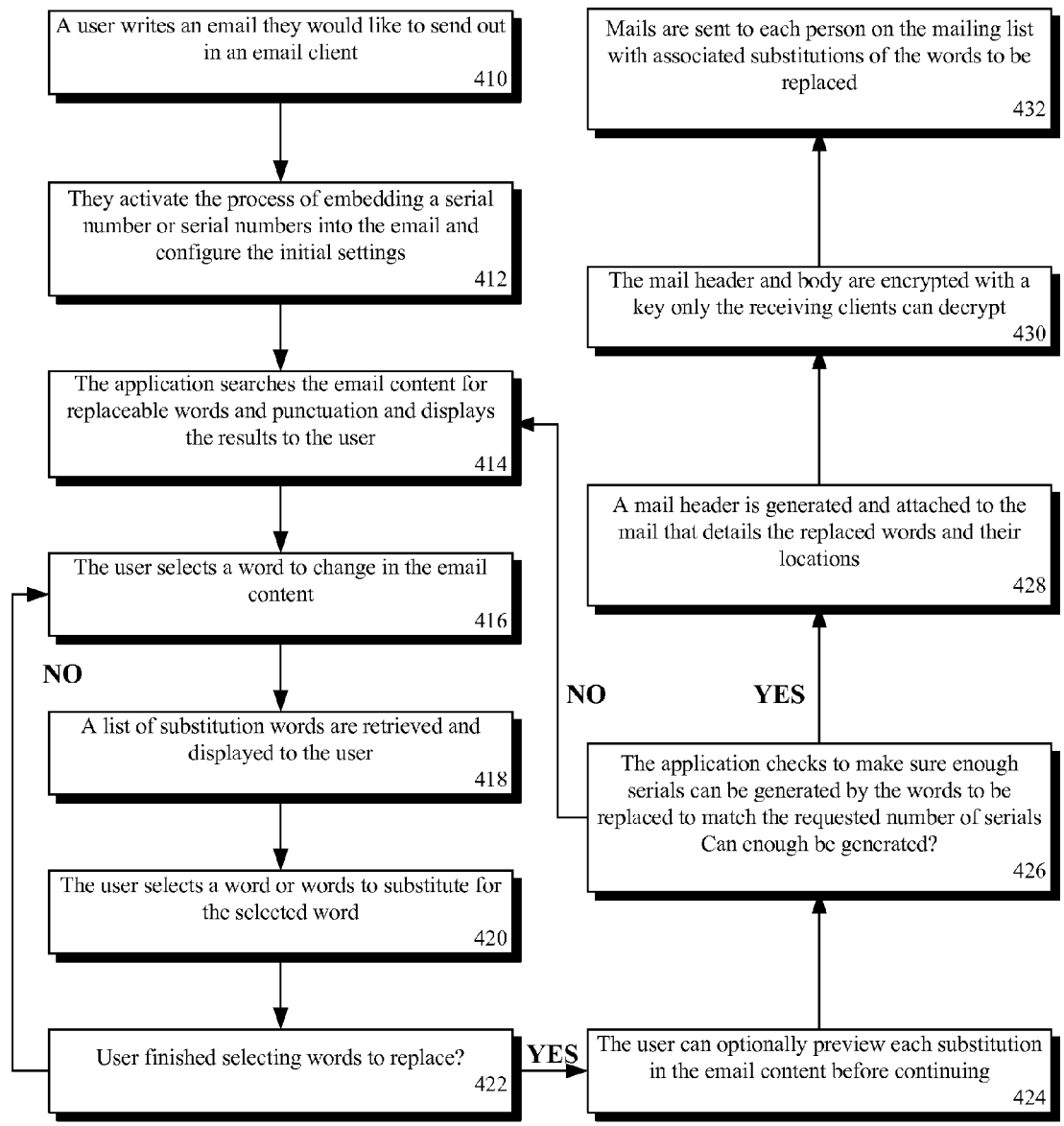
FIG. 4 is a flow chart of a method for embedding a unique serial number into the content of an email for tracking information dispersion in accordance with an embodiment of the inventive arrangements disclosed herein.

FIG. 4 is a flow chart of a method 400 for embedding a unique serial number into the content of an email for tracking information dispersion in accordance with an embodiment of the inventive arrangements disclosed herein. Method 400 can begin in step 410, where a user can write an email they would like to send in an email client. In step 412, the user can activate the process of embedding a serial number or serial numbers into the email and configure the initial settings. The user can activate the process of embedding the serial number or numbers in context with button 208 of system 200. The user can configure the initial settings in context with dispersion tracking configuration 250 of system 200. In step 414, the application can search the email content for replaceable words and punctuation and can optionally display the results to the user. The results can be displayed to the user in context with information dispersion tracking configuration 305 of system 300. A configurable option to enable/disable search results of replaceable words can be included in one embodiment of the invention. In step 416, the user can select a word to replace in the email content. The application can already display the replaceable words differently to show the user their options. In step 418, a list of substitution words can be retrieved and displayed to the user. In some embodiments, the substitution words can be synonyms retrieved from a thesaurus. In step 420, the user can select a word or words to be used to substitute the word selected in step 416. In step 422, the system can determine if the user is finished defining words to substitute in the email content.

If in step 422, the user is not completed, method 400 can return to step 416, where the user can select another word for substitution in the email content. If in step 422, the user is completed, method 400 can continue to step 424, where the user can optionally preview each substitution in the email content before continuing. Previewing each substitution can prevent substitutions from being allowed when they change the meaning or the content or do not have a good enough fit in the content. In this step, if the user chooses to preview each substitution, the user can accept or reject each possible substitution for the email content. In step 426, the application can check to make sure enough serials can be generated by the words to be replaced to match the requested number of serials. In one embodiment, this checking can be performed dynamically "on the fly," where a visual cue is presented to a user (e.g., a status display element) that indicates if enough words have been replaced to generate needed serials.

If in step 426, the application can not generate enough serials, method 400 can alert the user and return to step 414, where the application can search the email content for replaceable words and punctuation and displays the results to the user. If in step 426, the application can generate enough serials, method 400 can continue to step 428 where a mail header can be generated and attached to the mail that details the replaced words and their locations. In step 430, the mail header and body can be encrypted with a key only the receiving client or clients can decrypt. A key can be any key usable for encryption. One such example can be a public key infrastructure (PKI) key. These keys are split into a public and private key, where a private key is kept and a public key is distributed. When the keys are combined, they can allow the decryption of encrypted data. In step 432, mails can be sent to each person on the mailing list with associated substitutions of the words to be replaced.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method of tracking email dispersion through content substitution comprising:
   identifying a set of at least two email receiving entities for an email dispersion;
   identifying textual content of a body of an email message for the email dispersion to the set of email receiving entities;
   programmatically determining a plurality of words within textual content of the body of the email message, wherein each of the determined words have at least one synonym;
   generating a set of replacement words for each of the determined words, wherein each of the replacement words is a synonym of the corresponding one of the determined words;
   for each different email message to be sent to a specific one of the receiving entities, programmatically substituting at least one replacement word for a corresponding one of the determined words to generate an entity specific message, wherein each entity specific message contains a unique combination of substitutions in the body of the entity specific message, so that no two entity specific message are identical;
   maintaining a record of which email receiving entities are associated with which entity specific message; and
   conveying the entity specific messages to the set of email receiving entities.

2. The method of claim 1, further comprising:
   generating a unique serial number for each of the entity specific messages, wherein said unique serial number is generated based on a mathematical calculation having variable for a position and a value of the replacement words included in the email message body of the associated entity specific message, wherein the maintaining step records a plurality of records, one for each of the entity specific messages, wherein each record comprises a unique identifier for the entity specific message and comprises the unique number generated for the entity specific message.

3. The method of claim 2, wherein said unique serial number comprises at least one of a cyclic redundancy code (CRC) value of a modulus checking value, which is able to be used to ensure post conveyance modifications of the entity specific message have not been made.

4. The method of claim 1, further comprising:
   determining a number of unique combinations for entity specific messages based upon a total number of determined words and a total number of replacement words for the determined words;
   comparing a number of identified email receiving entities against the determined number of unique combinations;
   when the comparing step determines that there are more identified email receiving entities than unique combinations, automatically increasing at least one of a number of determined words within the textual content of the body of the email message and a number of replacement words contained within at least one set of replacement words; and repeating the comparing and increasing steps until there are more unique combinations than identified email receiving entities, at which point the method is able to proceed to the substituting, maintaining, and conveying steps.

5. The method of claim 1, wherein each email receiving entity is an email recipient having a unique email address.

6. The method of claim 1, wherein at least one email receiving entity comprises a group of email receiving entities, said group comprising a plurality of different email recipients, each of the different email recipients having a unique email address.

7. The method of claim 1, wherein each replacement word is manually selected by a user of a user interface from a set of presented possible word replacements.

8. A method of claim 1, further comprising:
inputting content from one of said conveyed entity specific messages into a recipient discovery program; and
a computing device executing the recipient discovery program to responsively produce an identifier for the entity associated with the entity specific message.

9. A method for generating a set of email messages, each containing approximately the same content that has been slightly varied so that each generated email message is unique, said method comprising:
identifying an email message containing textual content of a body of the email message;
determining a set of at least two recipients who are to receive a unique variation of the identified email message;
detecting a set of at least two words contained within the textual content of the body of the email message, wherein each of the words of the set have at least one synonym;
for each detected word, assigning at least one replacement word, wherein each of the replacement words is a synonym of the corresponding one of the words of the set;
generating a set of unique email messages, one associated with each recipient in the determined set of recipients, wherein each unique email message has a unique combination of detected word substitutions in a body of the corresponding email message;
for each generated email message, calculating a unique serial number based upon which replacement words are included in the body of the associated email message, wherein given a unique serial number and a formula used in the calculating step and given the textual content, the unique email message associated with the unique number is able to be automatically generated;
sending said unique email messages to associated recipients; and
storing the unique serial number and an identifier for the associated recipient.

10. The method of claim 9, wherein said unique serial number comprises at least one of a cyclic redundancy code (CRC) value of a modulus checking value, which is able to be used to ensure post conveyance modifications of the unique email messages have not been made.

11. The method of claim 9, further comprising:
identifying content of one of the unique email messages;
computing a serial number associated with the identified content; and
querying a storage space to determine a recipient associated with the serial number.

12. The method of claim 9, is manually selected by a user of a user interface from a set of presented possible word replacements.

13. The method of claim 9, wherein said steps of claim 9 are performed by at least one machine in accordance with at least one computer program stored in a computer readable media, said computer programming having a plurality of code sections that are executable by the at least one machine.

14. Software stored in at least one tangible storage medium and that is able to be loaded, and executed by the computing system comprising hardware to control the computer system, said software for tracking email recipients using modified message content comprising:
an original word set comprising a plurality of words included within a body of an email message, which is referred to as an original message, said said original message being digitally encoded in the tangible storage medium communicatively linked to the computer system;
a plurality of substitution sets digitally encoded in the tangible storage medium, each associated with one of the plurality of words of the original word set, wherein each of the substitution sets comprises at least one synonym for the associated original word;
a serial number generator, which is part of said software that when executed by the computer system is operable to generate a plurality of unique serial numbers that are to be associated with a unique variation of the original message, wherein given a unique serial number and given the original message, the unique email message associated with the unique serial number is able to be automatically generated by an algorithm, wherein a number of statistically unique combinations of original words and associated substantiation sets determines a number of unique serial numbers that the serial number generator is able to generate; and
a unique message generator, which is part of said software that when executed by the computer system is operable to receive the original message and a unique serial number as input and to generate a unique variation of the original message as output, wherein each unique variation is an email body for an email message in which two or more of the words from the original word set have been substituted with associated words of the substitution set, wherein the original word set and the substitution sets are specified by digitally encoded data stored in a computer readable media, and wherein serial number generator and the unique message generator are software digitally encoded in a computer readable medium executable by a computing device, which causes the computing device to perform a set of actions for which the serial number generator and the unique message generator are configured.

15. The software of claim 14, further comprising:
a unique message decoder, which is part of said software that when executed by the computer system is operable to receive a unique variation of the original message as input and to automatically determine the associated serial number based upon which substitution words are contained within the unique variation, wherein the unique message decoder is software digitally encoded in a computer readable medium executable by a computing device, which causes the computing device to perform a set of actions for which the unique message decoder is configured.

16. The software of claim 15, further comprising:

a serial number manager, which is part of said software that when executed by the computer system is operable to automatically store records associating recipients with serial numbers; and a recipient determination engine, which is part of said software that when executed by the computer system is operable to determine from a serial number determined by the unique message decoder and from associations managed by the serial number manager, a recipient identifier associated with a unique variation, wherein serial number manager and the recipient determination engine are software digitally encoded in a computer readable medium executable by a computing device, which causes the computing device to perform a set of actions for which the serial number manager and the recipient determination engine are configured.

17. The software of claim 14, further comprising:

a user interface, which is generated by said software executing on the computer system, said user interface being configured to permit a user to determine whether to create said unique variations that are associated with serial numbers created by the serial number generator.

18. The software of claim 17, wherein said user interface is an interface of an email application.

19. The software of claim 17, wherein said user interface automatically suggests a set of automatically determined synonyms for each of the words of the word set, wherein the synonyms included in the substitution sets are user approved ones of the suggested synonyms.

20. The software of claim 16, further comprising:

a user interface, which is generated by said software executing on the computer system, said user interface being configured to permit a user to determine whether to create said unique variations that are associated with serial numbers created by the serial number generator and further configured to permit a user to input a unique variation, which is processed by the unique message decoder and the recipient determination engine to determine a recipient to whom the unique variation is associated.

* * * * *